(12) United States Patent
Hosokawa et al.

(10) Patent No.: US 6,857,637 B2
(45) Date of Patent: Feb. 22, 2005

(54) ROTATION SHAFT SEAL

(75) Inventors: Atsushi Hosokawa, Arida (JP); Hideo Nagaoka, Arida (JP); Takeshi Yamada, Kariya (JP); Yuji Kaneshige, Kariya (JP)

(73) Assignees: Mitsubishi Cable Industries, Ltd., Amagasaki (JP); Kabushiki Kaisha Toyoda Jidoshokki, Kariya (JP)

( * ) Notice: Subject to any disclaimer, the term of this patent is extended or adjusted under 35 U.S.C. 154(b) by 0 days.

(21) Appl. No.: 10/251,758

(22) Filed: Sep. 23, 2002

(65) Prior Publication Data

US 2003/0057657 A1 Mar. 27, 2003

(30) Foreign Application Priority Data

Sep. 25, 2001 (JP) ........................................ 2001-290449

(51) Int. Cl.[7] ................................................ F16J 15/32
(52) U.S. Cl. ...................................... 277/552; 277/558
(58) Field of Search ................................ 277/552, 558, 277/560, 562–6, 402

(56) References Cited

U.S. PATENT DOCUMENTS

| | | | | |
|---|---|---|---|---|
| 3,254,898 A | * | 6/1966 | Herbenar et al. | 277/558 |
| 3,885,802 A | * | 5/1975 | Wheeler | 277/560 |
| 4,350,347 A | * | 9/1982 | Heinrich | 277/549 |
| 4,522,411 A | * | 6/1985 | Burgan | 277/552 |
| 4,546,985 A | * | 10/1985 | Forch | 277/560 |
| 4,637,295 A | * | 1/1987 | Powers et al. | 92/170.1 |
| 4,750,747 A | * | 6/1988 | Holzer | 277/559 |
| 4,772,138 A | * | 9/1988 | Dreschmann et al. | 384/488 |
| 4,815,749 A | * | 3/1989 | Johnston | 277/559 |
| 4,917,390 A | * | 4/1990 | Lee et al. | 277/589 |
| 4,964,647 A | * | 10/1990 | Stephan | 277/560 |
| 5,083,802 A | * | 1/1992 | Shimasaki et al. | 277/560 |
| 5,183,271 A | * | 2/1993 | Wada et al. | 277/351 |
| 5,328,178 A | * | 7/1994 | Nies | 277/438 |
| 5,738,358 A | * | 4/1998 | Kalsi et al. | 277/544 |
| 6,029,980 A | * | 2/2000 | Downes | 277/552 |
| 6,592,337 B2 | * | 7/2003 | Yamada et al. | 417/222.2 |

FOREIGN PATENT DOCUMENTS

| | | | |
|---|---|---|---|
| EP | 1004801 A2 | * | 5/2000 |
| GB | 2085096 A | * | 4/1982 |

* cited by examiner

*Primary Examiner*—Alison K. Pickard
(74) *Attorney, Agent, or Firm*—Armstrong, Kratz, Quintos, Hanson & Brooks, LLP

(57) ABSTRACT

A rotation shaft seal disposed between a housing and a rotation shaft, and provided with a seal member of rubber having a lip end portion which extends as to diminish in diameter to a fluid storing chamber side, wherein the lip end portion has a contact portion which contacts a surface of the rotation shaft and an end face which is facing the rotation shaft, and a concave portion, generating a component of force in diameter direction to raise the lip end portion outward in the diameter direction when receiving pressure in the fluid storing chamber, is formed on the end face.

7 Claims, 4 Drawing Sheets

ROTATION SHAFT SEAL

BACKGROUND OF THE INVENTION

1. Field of the Invention

This invention relates to a rotation shaft seal, especially, a rotation shaft seal used for sealing high pressure fluid such as gas.

2. Description of the Related Art

Conventionally, a rotation shaft seal of this kind, as shown in FIG. 6, is provided with a seal member 43 of rubber which is disposed between a housing 41 and a rotation shaft 42 and having a lip end portion 44 extending to a fluid storing chamber 47 as to diminish in diameter. The lip end portion 44 has a contact portion 46 which contacts a peripheral face of the rotation shaft 42 and an end face 45 facing the rotation shaft 42 with an acute angle θ. The contact portion 46 and the end face 45 of the lip end portion 44, having configurations smoothly changing from a round convex to a straight line, are widely used.

As shown in FIG. 6, when the pressure of the fluid sealed in the fluid storing chamber 47 is high, contact pressure of the contact portion 46 of the lip end portion 44 on the rotation shaft 42 becomes high. And, when the rotation frequency of the rotation shaft 42 is high, sealing ability is decreased because the contact portion 46 is rapidly abraded by friction on the rotation shaft 42.

It is therefore an object of the present invention to provide a rotation shaft seal having high durability in which the abrasion of the contact portion of the seal member for sealing is reduced even if the pressure of the sealed fluid is high.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
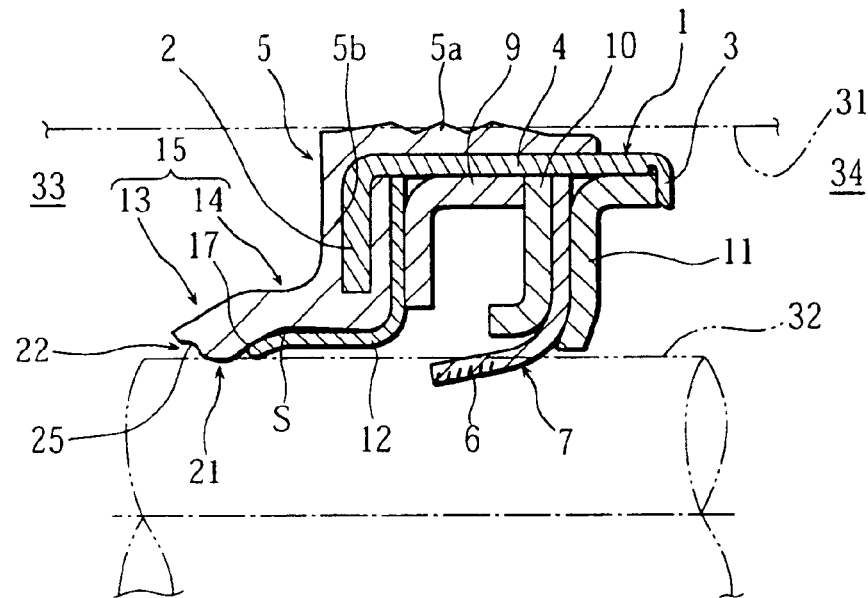
FIG. 1 is a cross-sectional side view showing a preferred embodiment of a rotation shaft seal of the present invention.

FIG. 1 shows a rotation shaft seal relating to the present invention, which is used, for example, for a compressor of air conditioner for automobiles in which a high pressure cooling medium (such as $CO_2$) works on a fluid storing chamber 33 side. This rotation shaft seal is disposed between a housing 31 (on its inner peripheral face) such as a case of the compressor and a rotation shaft 32 (on its peripheral face) to seal fluid such as high pressure cooling medium.

In FIG. 1, a half of the cross section of the rotation shaft seal is shown, and the rotation shaft 32 and the housing 31 are shown with two-dot broken lines. And, the configuration of the rotation shaft seal shown in FIG. 1 is in an unattached state, namely, a free state, and parts described below are elastically deformed when the seal is in an attached state between the rotation shaft 32 and the housing 31.

To explain the construction concretely, as shown in FIG. 1, the shaft seal is provided with a seal member 5 made of rubber fixed to and united with a peripheral face of a cylinder portion 4 of the outer case 1 of metal having inner brim portions 2 and 3 and both sides of the inner brim portion 2 on a front side (the fluid storing chamber 31 side) by adhesion, welding, baking, etc., and a seal element 7 (of which material is a fluororesin such as PTFE) with a spiral groove 6 on a low-pressure (atmosphere) side 34, namely, a rear side.

To describe further in detail, a supporting metal 12 disposed as to hold a back face (rear and inner peripheral side) of the seal member 5, a first inner case 9, a washer 10, and a second inner case 11.

The seal member 5 unitedly fixed to the outer case 1 is composed of a cylindrical cover portion 5a of which peripheral face is formed into concavo-convex wave form (in the free state) to elastically contact an inner peripheral face of the housing 31 for seal working, an inner brim cover portion 5b of which cross section is U-shaped covering both sides of the inner brim portion 2 on the front side, and a lip portion 15 protruding from an inner peripheral side of the inner brim cover portion 5b to the fluid storing chamber 33 side (the front side). A connecting portion of the inner brim cover portion 5b on the fluid storing chamber 33 side and the lip portion 15 is arc-shaped as to soften the stress generated by the fluid pressure (as to make flow of the stress smooth).

Figure 2:
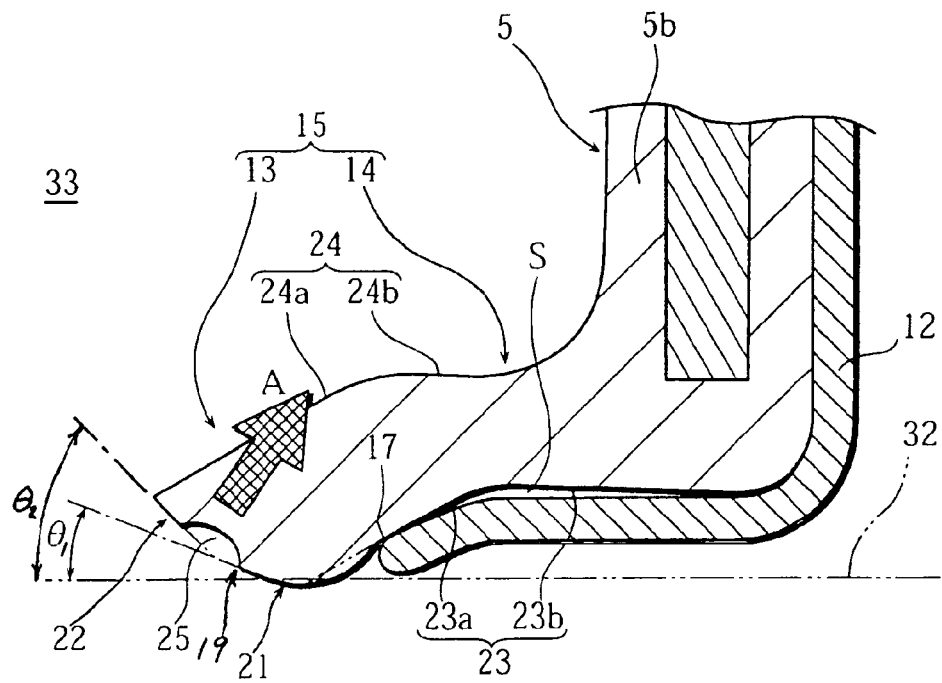
FIG. 2 is an enlarged cross-sectional view of a principal portion of the rotation shaft seal.

To describe further in detail, as shown in FIG. 2, the lip portion 15 of the seal member 5 of rubber has a short cylinder portion 14 straight in an axis direction of the rotation shaft 32 and a lip end portion 13 which extends as to diminish in diameter gradually from the short cylinder portion 14 to the fluid storing chamber 33 side (high pressure side), namely, incline inward as proceed forward, and the lip portion 15 has a bent configuration in cross section.

To describe the lip portion 15, a peripheral side of the lip portion 15 is an outer lip face 24 which is divided into an end outer lip face 24a and a cylinder outer lip face 24b on the lip end portion 13 and the short cylinder portion 14, and an inner peripheral side of the lip portion 15 is an inner lip face 23 which is divided into an end inner lip face 23a and a cylinder inner lip face 23b. And, an end face 22 is formed on the forward end of the end outer lip face 24a inclined at an acute angle with respect to the end outer lip face, and a contact portion 21 is disposed between the end face 22 and the end inner lip face 23a. Further, to describe the lip end portion 13, the contact portion 21 (a sealing portion) contacts a surface (peripheral face) of the rotation shaft 32 to form a cutting face 19 from the contact portion 21 (a sealing portion) contacts a surface (peripheral face) of the rotation shaft 32 to form a cuffing face 19 from the contact portion 21 toward the fluid storing chamber 33 side with a cuffing angle $\theta_1$. Further, the end face 22 is formed as to face (obliquely) the rotation shaft 32 with an acute angle $\theta_2$ from the contact portion 21 (the cutting face 19) on the fluid storing chamber 33 side. The relationship between the cutting angle $\theta_1$ and the acute angle $\theta_2$ is $\theta_1 < \theta_2$, and $<\theta_2 < 90°$. And, the contact portion 21 contacts the peripheral face of the rotation shaft 32 with a narrow area contact in the attached state (used state) of the rotation shaft seal to seal the fluid storing chamber 33.

Figure 3:
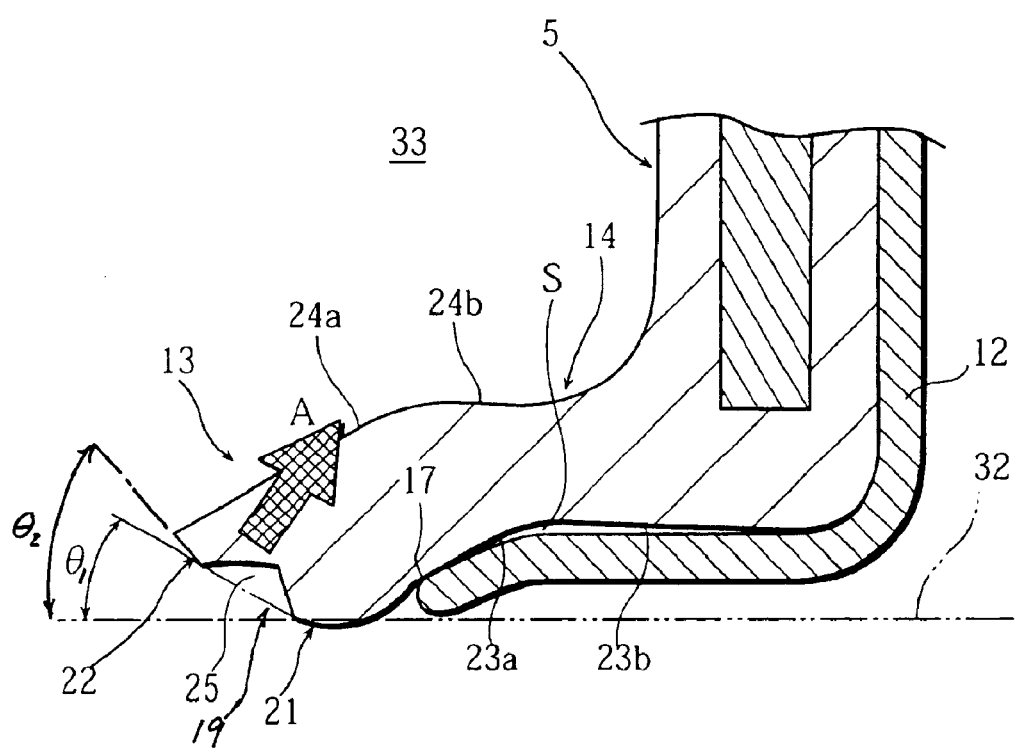
FIG. 3 is an enlarged cross-sectional view showing another embodiment of the rotation shaft seal of the present invention.

Although described later in detail, a concave portion 25 (recessed portion) is formed to generate a component of force in a diameter direction to raise the lip end portion 13 in a diameter-expanding direction (a direction toward the housing 31) by receiving the fluid pressure in the fluid storing chamber 33. The concave portion 25, formed circular on the end face 22 as a small concave groove, can be easily formed with a mold when the seal member 5 is formed. The concave portion 25, other than an arc cross-sectional configuration as shown in FIG. 2, may be formed into a configuration of bent-straight line (triangle notch) as shown in FIG. 3. And, although not shown in figures, the concave portion 25, composed as to have a pressure-receiving surface facing toward the housing 31 (opposite to the rotation shaft), may be formed as a notched groove (concave groove) formed on an inner side of an end face of a conventional configuration with a convex ridge on an outer side of the conventional configuration. The concave portion 25 may be formed continuously as a circular groove or uncontinuously in a peripheral direction.

Then, when the pressure of the fluid in the fluid storing chamber 33 works on the concave portion 25 which is disposed on the cutting face 19 and the end face 22 formed as to face the peripheral face of the rotation shaft 32 with the acute angle $\theta_2$, the pressure-receiving face is formed in the concave portion 25 toward the housing 31, the component in diameter direction works to raise the lip end portion 13 (the component works in a direction parting from the rotation shaft 32) by function of outer force (vector) in the arrow A direction in FIG. 2 (and FIG. 3), and pressure on the contact portion 21 with the rotation shaft 32 is reduced. In this case, of course, the pressure generation is only reduced as the contact portion 21 does not leave the rotation shaft 32.

And, the contact portion 21 of the lip end portion 13 or near part of the contact portion 21, namely, from a middle portion of the end inner lip face 23a to an end of the concave portion 25, is formed into a protruding arc. In FIG. 2, the protruding arc portion is near a back face of the contact portion 21. The radius of curvature of the arc is preferably large to improve lubrication with the rotation shaft 32. And, lubrication between the contact portion 21 and the rotation shaft 32 can be improved by setting the cutting angle $\theta_1$ (acute angle) of the cutting face 19 shown in FIG. 2 small.

Next, as shown in FIG. 1, the supporting metal 12 is approximately L-shaped in cross section to support the rear side wall portion or inner periphery of the inner brim cover portion 5b of the seal member 5, and the lip end portion 13 to its middle portion. The first inner case 9 of approximately L-shaped cross section as a spacer, the washer 10, the seal element 7, the second inner case 11 as a holding piece of the seal element 7, are serially disposed behind the supporting metal 12, and fixed (held) between the front and rear inner brim portions 2 and 3 by bending the inner brim portion 3 of the outer case 1 by plastic work.

To describe the supporting metal 12 further, the supporting metal 12 is playing a role (function or working) as a gas shielding member and a role (function or working) to prevent the sealed fluid from permeating by tightly fitting (touching) the back face (rear face or inner face) of the seal member 5 in the whole area except near the contact portion 21 of the seal member 5 in FIG. 1. That is to say, the role (function or working) of the supporting metal 12 as the gas shielding member becomes important when a cooling medium gas having relatively high permeability to rubber, such as $CO_2$ gas is used as the fluid in the fluid storing chamber 31.

And, a gap S is formed between the seal member 5 of rubber and the supporting metal 12 disposed as to hold the back face of the seal member 5 of rubber. To describe concretely, the seal member 5 is disposed as the cylinder inner lip face 23b and the end inner lip face 23a, to its middle portion, have the gap S with the supporting metal 12, and the supporting metal 12 contacts the lip end portion 13 (the end inner lip face 23a) on the contact point 17 on the front peripheral side of the supporting metal 12. The lip end portion 13 may be parted from the front peripheral side (the contact point 17) of the supporting metal 12 as not to contact before pressurized.

And, as the fluid pressure on the fluid storing chamber 33 side increases, the lip portion 15 elastically deforms as mainly the short cylinder portion 14 of the seal member 5 of rubber intrudes (moves) to the gap S to eliminate the gas S. The lip end portion 13 is pulled in a parting direction from the rotation shaft 32 (the direction toward the housing 31) by the intrusion into the gap S. In other words, the lip end portion 13 is moved in the parting direction from the rotation shaft 32 on the contact point 17 as a supporting point.

The seal member 5 is, considering durability to cooling media, made of HNBR or EPDM. Hardness of the seal member 5 is preferably set to be 87 to 96 in JIS hardness. With this hardness, the displacement function by the gap S is made effective, and sealability is secured. (When the JIS hardness is less than 87, deformation is excessive. On the contrary, when the hardness is more than 96, elasticity is insufficient.)

The area of the protruding arc of large radius of curvature on the lip end portion 13 is at least an area from the contact portion 21 to the contact point 17 near the back face (rear side) of the contact portion 21.

Figure 4:
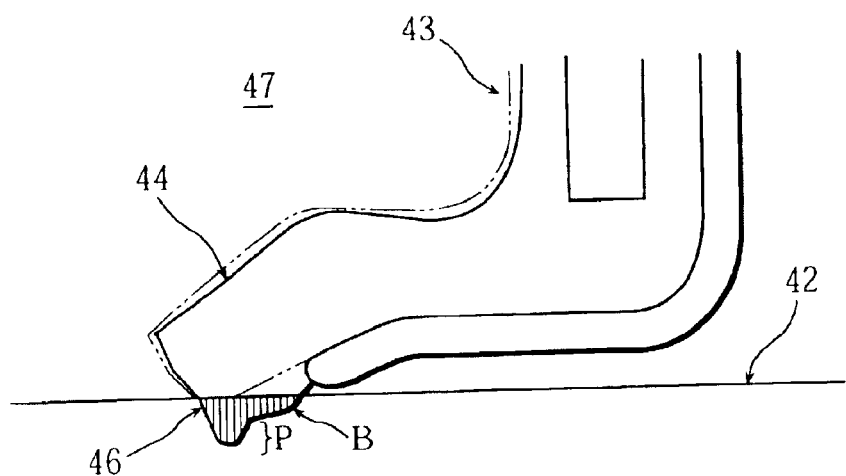
FIG. 4 is an explanatory view showing pressure distribution on a contact portion of a conventional rotation shaft seal.

Next, distribution of contact pressure with the rotation shaft 42 in the conventional rotation shaft seal is shown in FIG. 4. In FIG. 4, remarkably high pressure (peak) P is on a position of the contact portion 46 of the lip end portion 44 corresponding to an arc corner in unattached state, and high pressure B is also generated on the rear side to the pressure P.

And, an outer shape of the seal member 43 before the deformation (before the pressurization) is shown with a two-dot broken line. The seal member 43 is greatly displaced to the rotation shaft 42 side on the lip end portion 44 after the pressurization as shown with a continuous line. That is to say, when the fluid pressure generated in the fluid storing chamber 47 becomes high, the high peak pressure P is generated on the contact portion 46 by the great deformation of the lip end portion 44 toward the rotation shaft 42 side. Therefore, sealing ability may be gradually reduced because the lip end portion is severely abraded especially by the peak pressure P.

Figure 5:
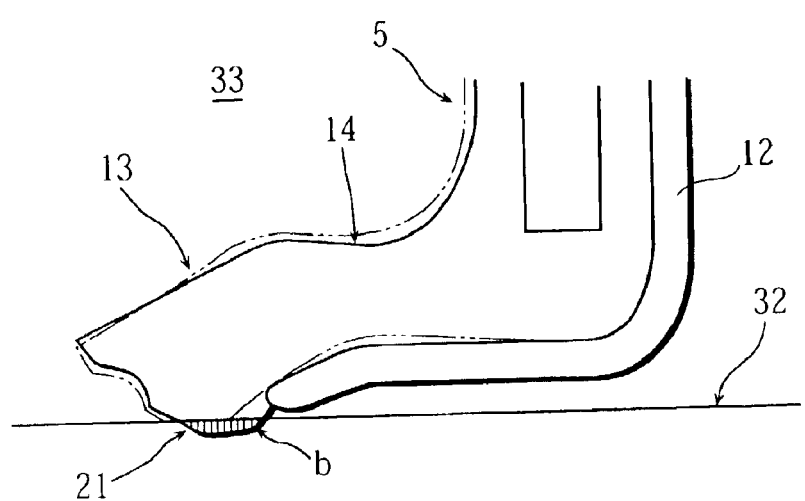
FIG. 5 is an explanatory view showing pressure distribution on a contact portion of the rotation shaft seal of the present invention.
Figure 6:
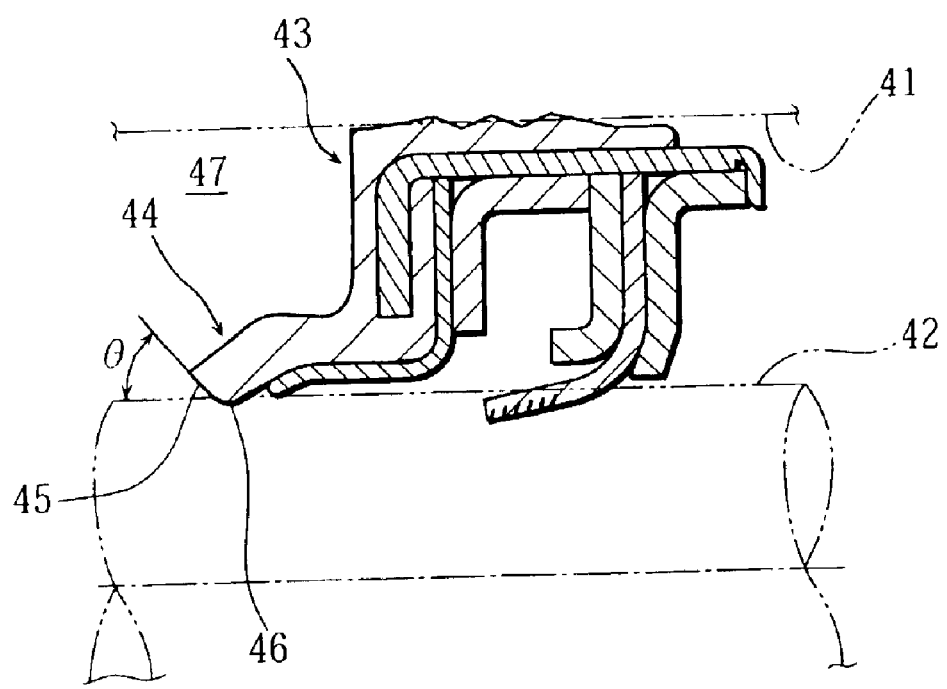
FIG. 6 is a cross-sectional side view of the conventional rotation shaft seal.

Next, distribution of contact pressure with the rotation shaft 32 in the rotation shaft seal of the present invention is shown in FIG. 5. The distribution of the contact pressure on the contact portion 21 is having no peak portions and approximately uniform in the whole area, and generated pressure b can be made small in comparison with the conventional seal. And, width of the contact portion 21 (pressing width) is smaller than that of the conventional seal to form an appropriate interference.

And, an outer shape of the seal member 5 before the deformation (before the pressurization) is shown with a two-dot broken line. After the pressurization, the short cylinder portion 14 is moved to the gap S, and the lip end portion 13 is deformed as to be raised in an expanding (outer) direction without great displacement toward the rotation shaft 32 side. Therefore, the contact portion 21 does not receive extremely high pressure, the pressure can be made low, and the abrasion of the contact portion 21 can be reduced even if the rotation shaft 32 rotates at high frequency.

That is to say, initial pressing force generated by the elastic deformation of the lip end portion 13 when the rotation shaft seal is attached, and pressing force on the lip end portion 13 by the fluid pressure in the fluid storing chamber 33, work on the rotation shaft 32 through the seal member 5 of rubber. The pressing forces are softened (rubber deformation is made uniform and stable) even if the fluid pressure is high by the raising function of the concave portion 25, the displacement function of the gap S, and the function of the arc-shaped contact portion 21. The pressure is reduced thereby to lower sliding resistance to prevent heat generation and abrasion of the seal member 5. Therefore, the rotation shaft seal has high sealing ability.

Returning to FIG. 1, with the seal element 7, even if slight leakage is generated on the seal member 5, the leakage is pushed back to the seal member 5 side by hydrodynamic effect by the spiral groove 6 and the fluid does not leak out of the rotation shaft seal when the rotation shaft 32 rotates.

And, in the present invention, not restricted to the embodiments above, although not shown in Figures, the various components of the invention can be freely added and omitted as that one more seal element may be disposed on an outer side to make a double seal, a rear seal member, having an initial interference approximately 0 for sealing when the rotation shaft is static, may be disposed on an outer side of the seal element, or a combination of these two systems may be adopted.

According to the rotation shaft seal of the present invention, the contact pressure of the contact portion 21 of the lip end portion 13 on the rotation shaft 32 is lowered in the used state, in which the pressure in the fluid storing chamber 33 is increased, to reduce the abrasion of the contact portion 21. Therefore, the rotation shaft seal having high durability and without leakage can be constructed.

And, appropriate sealing state is kept by the supporting metal 12 to prevent excessive deformation of the seal element 5, the contact pressure of the contact portion 21 on the rotation shaft 32 is lowered further in the used state in which the pressure in the fluid storing chamber 33 is increased, and the abrasion of the contact portion 21 can be reduced to improve the durability.

And, the contact portion 21 can uniformly contact the rotation shaft 32, partial abrasion of the contact portion 21 can be prevented by making the generated pressure uniform and deformation amount small to enhance the sealing ability.

Further, the contact pressure of the contact portion 21 against the rotation shaft 32 can be softened with a simple construction.

While preferred embodiments of the present invention have been described in this specification, it is to be understood that the invention is illustrative and not restrictive, because various changes are possible within the spirit and indispensable features.

What is claimed is:

1. A rotation shaft seal, provided with a seal member of rubber having a lip end portion extending as to diminish in diameter toward a fluid storing chamber side and having a contact portion which contacts a surface of a rotation shaft, and an end face inclinedly facing the rotation shaft, said seal member being disposed between a housing and the rotation shaft and comprising concave portion extending annularly about said end face and being disposed in an intermediate position of said end face between said contact portion and an outer periphery of said lip end portion at a location operative to receive pressure from the fluid storing chamber and to generate a component of force in a diameter direction tending to relieve the lip end portion in a diameter-extending direction.

2. The rotation shaft seal as set forth in claim 1, including a supporting metal disposed as to hold a back face of the seal member of rubber, and wherein a gap is formed between the seal member of rubber and the supporting metal, the seal member of rubber being elastically deformed as to intrude into the gap as the pressure on the fluid storing chamber side is increased, and the lip end portion is urged in the diameter-extending direction.

3. The rotation shaft seal as set forth in claim 1 or claim 2, wherein the contact portion of the lip end portion, or a portion adjacent to the contact portion, is formed into a protruding arc shape.

4. The rotation shaft seal as set forth in claim 1 or claim 2, wherein a cross-sectional configuration of the concave portion is arc-shaped.

5. The rotation shaft seal as set forth in claim 3, wherein a cross-sectional configuration of the concave portion is arc-shaped.

6. The rotation shaft seal as set forth in claim 1 or claim 2, wherein a cross-sectional configuration of the concave portion is a bent-straight line.

7. The rotation shaft seal as set forth in claim 3, wherein a cross-sectional configuration of the concave portion is a bent-straight line.

* * * * *